US008984552B2

(12) United States Patent
Shaw et al.

(10) Patent No.: US 8,984,552 B2
(45) Date of Patent: Mar. 17, 2015

(54) APPARATUS AND METHOD FOR PROVIDING MEDIA CONTENT

(71) Applicants: AT&T Intellectual Property I, LP, Atlanta, GA (US); AT&T Mobility II LLC, Atlanta, GA (US)

(72) Inventors: Venson Shaw, Kirkland, WA (US); Jun Shen, Redmond, WA (US)

(73) Assignees: AT&T Intellectual Property I, LP, Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/301,709

(22) Filed: Jun. 11, 2014

(65) Prior Publication Data
US 2014/0293128 A1 Oct. 2, 2014

Related U.S. Application Data

(63) Continuation of application No. 13/471,865, filed on May 15, 2012, now Pat. No. 8,789,095.

(51) Int. Cl.
*H04N 5/445* (2011.01)
*H04N 7/16* (2011.01)
(Continued)

(52) U.S. Cl.
CPC ....... *H04N 7/0117* (2013.01); *H04N 21/23439* (2013.01); *H04N 21/4402* (2013.01); *H04N 21/45455* (2013.01); *H04N 21/45* (2013.01);
(Continued)

(58) Field of Classification Search
CPC . H04N 1/393; H04N 1/3935; H04N 21/4516; G06T 3/40
See application file for complete search history.

(56) References Cited

U.S. PATENT DOCUMENTS

5,610,653 A 3/1997 Abecassis
6,247,150 B1 6/2001 Niemela
(Continued)

FOREIGN PATENT DOCUMENTS

WO 02/25940 3/2002

OTHER PUBLICATIONS

Liu, et al., "Automatic Browsing of Large Picture on Mobile Devices", ACM, Nov. 2003.
(Continued)

*Primary Examiner* — Nathan Flynn
*Assistant Examiner* — James R Marandi
(74) *Attorney, Agent, or Firm* — Guntin & Gust, PLC; Joseph P. Hrutka

(57) ABSTRACT

A system that incorporates teachings of the subject disclosure may include, for example, receiving video content at a mobile device via a network from a video server wherein a single version of the video content is provided by the video server to a group of mobile devices that includes the mobile device, utilizing the mobile device for adjusting dimensions of an area of attention in an image of the video content based on a desired display resolution to generate an adjusted area of attention, utilizing the mobile device for adjusting dimensions of a peripheral portion that surrounds the area of attention in at least one of a horizontal or vertical direction based on the adjusted area of attention to generate an adjusted peripheral portion of an adjusted image, and replacing the image with the adjusted image during presentation of the video content at a display of the mobile device. Other embodiments are disclosed.

20 Claims, 6 Drawing Sheets

(51) Int. Cl.
*H04N 21/45* (2011.01)
*G06F 3/00* (2006.01)
*G06F 13/00* (2006.01)
*H04N 7/01* (2006.01)
*H04N 21/2343* (2011.01)
*H04N 21/4402* (2011.01)
*H04N 21/4545* (2011.01)
*H04N 1/393* (2006.01)
*G06T 3/40* (2006.01)

(52) U.S. Cl.
CPC ............ *H04N 21/4516* (2013.01); *H04N 1/393* (2013.01); *G06T 3/40* (2013.01)
USPC .................. 725/37; 725/44; 725/60; 725/62; 725/135

(56) References Cited

U.S. PATENT DOCUMENTS

| | | |
|---|---|---|
| 6,981,045 B1 | 12/2005 | Brooks |
| 6,988,095 B1 | 1/2006 | Dorfman |
| 2003/0025836 A1 | 2/2003 | An |
| 2005/0097604 A1 | 5/2005 | Shintani |
| 2007/0011702 A1 | 1/2007 | Vaysman |
| 2007/0113246 A1 | 5/2007 | Xiong |
| 2007/0288986 A1 | 12/2007 | Candelore |
| 2009/0204989 A1 | 8/2009 | White et al. |

OTHER PUBLICATIONS

Vaka, et al., "Attention-Based Super Resolution from Videos", IEEE, 2008.

APPARATUS AND METHOD FOR PROVIDING MEDIA CONTENT

CROSS-REFERENCE TO RELATED APPLICATION

This application is a continuation of U.S. patent application Ser. No. 13/471,865 filed May 15, 2012. All sections of the aforementioned application are incorporated herein by reference in their entirety.

FIELD OF THE DISCLOSURE

The subject disclosure relates generally to communications and more specifically to providing media content.

BACKGROUND

Media content, such as video, can be presented in many different formats by recipient display devices. The particular format can depend on the characteristics of the recipient display device, as well as the content that has been transmitted. Generating each of the different formats that can possibly be used by all of the potential recipient display devices would be a difficult task requiring the use of a large amount of service provider resources.

BRIEF DESCRIPTION OF THE DRAWINGS

Reference will now be made to the accompanying drawings, which are not necessarily drawn to scale, and wherein.

DETAILED DESCRIPTION

Figure 1:
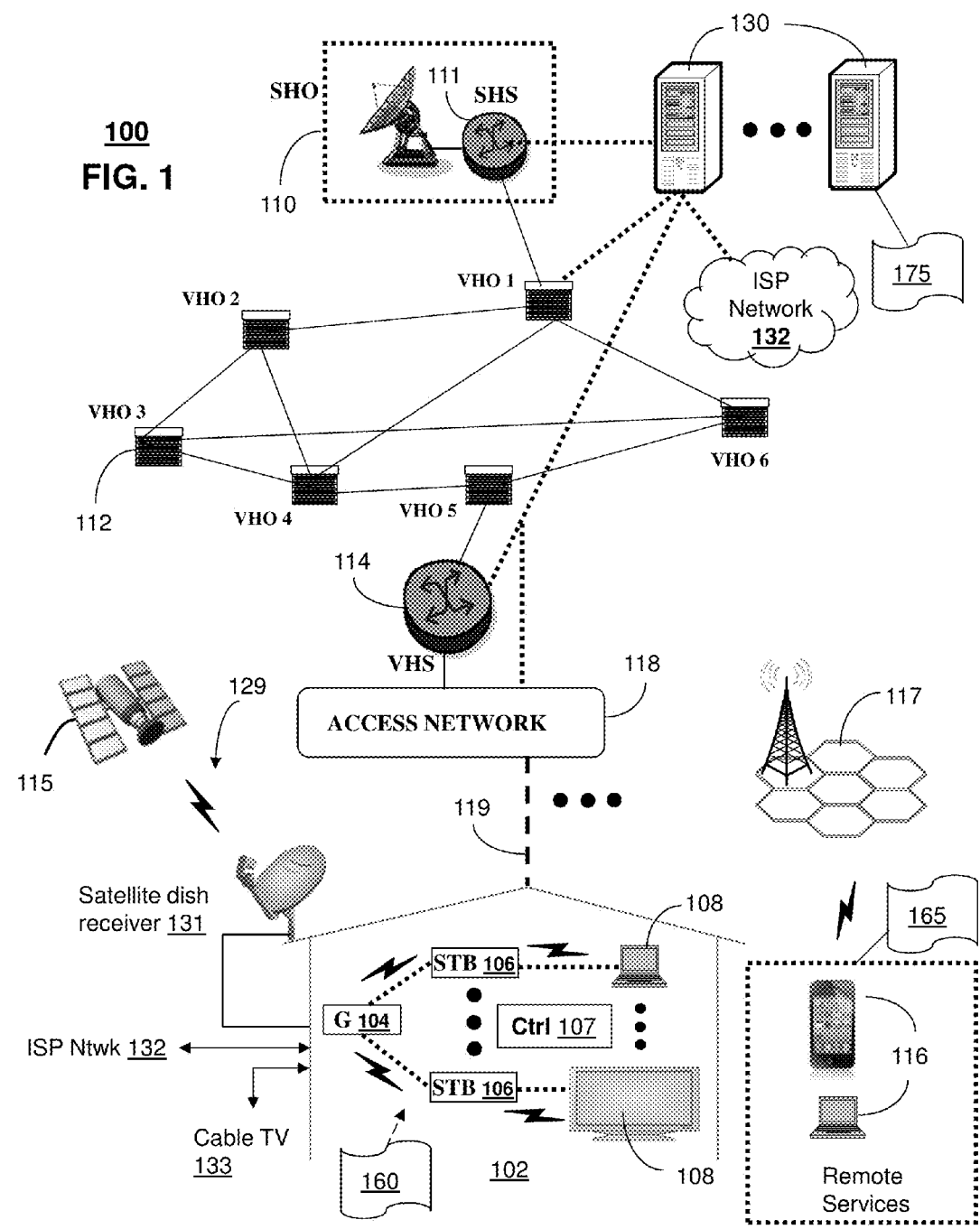
FIG. 1 depicts an illustrative embodiment of a communication system that provides media services.

The subject disclosure describes, among other things, illustrative embodiments of identifying area(s) of attention in image(s) and adjusting the images based on the area(s) of attention. The adjustments can include repositioning of the area(s) of attention, altering the size of the area(s) of attention and/or adjusting the display resolution within the area(s) of attention. Peripheral portion(s) of the image(s) can then be modified based on these adjustments to the area(s) of attention to comply with device characteristics, including aspect ratio and display resolution. Other embodiments are contemplated by the subject disclosure.

One embodiment of the subject disclosure includes a mobile device including a display, a memory storing computer instructions, and a processor coupled with the memory and the display. The processor, responsive to executing the computer instructions, performs operations including receiving video content over a network from a video server, parsing the video content, and identifying a first area of attention in a first image of the video content based on the parsing. The operations include determining a first shape for the first area of attention, identifying a second area of attention in a second image of the video content based on the parsing, and determining a second shape for the second area of attention. The operations include adjusting the first shape based on a desired display resolution for the video content to generate an adjusted first shape for the first area of attention in an adjusted first image, and adjusting the second shape based on the desired display resolution to generate an adjusted second shape for the second area of attention in an adjusted second image. The operations include identifying a first peripheral portion of the first image that surrounds the first shape, and identifying a second peripheral portion of the second image that surrounds the second shape. The operations include stretching the first peripheral portion in at least one of a horizontal or vertical direction based on the adjusting of the first shape, the desired display resolution and a desired aspect ratio for the video content to generate an adjusted first peripheral portion for the adjusted first image. The operations include stretching the second peripheral portion in at least one of the horizontal or vertical direction based on the adjusting of the second shape, the desired display resolution and the desired aspect ratio for the video content to generate an adjusted second peripheral portion for the adjusted second image. The operations include presenting the adjusted first and second images in place of the first and second images during presentation of the video content at the display.

One embodiment of the subject disclosure includes a non-transitory computer-readable storage medium comprising computer instructions, which, responsive to being executed by a processor of a media device, cause the processor to perform operations including receiving video content over a network from a video server. The operations include identifying an area of attention in an image of the video content and adjusting a size of the area of attention based on a desired display resolution to generate an adjusted area of attention. The operations include adjusting a size of a peripheral portion that surrounds the area of attention in at least one of a horizontal or vertical direction based on the adjusted area of attention, the desired display resolution and a desired aspect ratio to generate an adjusted peripheral portion of an adjusted image that utilizes a first display resolution within the adjusted area of attention and a second display resolution in the adjusted peripheral portion. The operations include replacing the image with the adjusted image during presentation of the video content at a display of the media device.

One embodiment of the subject disclosure includes a method including receiving video content at a mobile device via a network from a video server where a single version of the video content is provided by the video server to a group of mobile devices that includes the mobile device. The method also includes utilizing the mobile device for adjusting dimensions of an area of attention in an image of the video content based on a desired display resolution to generate an adjusted area of attention of an adjusted image. The method further includes utilizing the mobile device for adjusting dimensions of a peripheral portion that surrounds the area of attention based on the adjusted area of attention to generate an adjusted peripheral portion in the adjusted image and replacing the image with the adjusted image during presentation of the video content at a display of the mobile device.

FIG. 1 depicts an illustrative embodiment of a first communication system 100 for delivering media content. The communication system 100 can represent a mobile communication network and/or an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

Communication system 100 can also provide for all or a portion of the computing devices 130 to function as a video server. The video server 130 can use computing and communication technology to perform function 175, which can include among things, generating or otherwise obtaining multiple versions of content, including video and/or audio content, where the different version have different levels of error correction (e.g., forward error correction including Reed-Solomon coding, Golay coding, BCH coding, multi-dimensional parity coding, Hamming coding, other types of block coding, convolution coding, concatenated coding, low-density parity check coding, turbo coding, and so forth) and/or different resolutions. In one embodiment, the video server 130 can generate the multiple versions from a first version of the media content received at the video server 130. In another embodiment, the video server 130 can receive the multiple version of the media content from one or more other sources. The video server 130 can switch between the versions of the media content that are being provided based on a need or request for more error correction data in the signal to facilitate maintaining signal lock for the recipient media device(s). For example, the video server 130 can begin a broadcast, multicast or unicast of a first version of media content that has a high resolution with little if any error correction data. Upon detection of a fault or other undesired condition associated with the transmission of the media content and/or associated with the presentation of the media content, the video server 130 can switch to providing a second version of the media content that has a lower resolution and more error correction data. This process of detection and switching can be repeated until there are no more versions of media content available to provide more error correction and thereby maintain the link for the media device(s). At this point, the video server 130 can provide a message indicating that there are no other content versions available. In one embodiment, the message can be provided to the media device so that a white screen or other error-indicative interface can be displayed at the media device while the audio content is still provided to the media device. The particular type of fault or undesired condition that is detected can vary and can be based on one or more of jitter, signal-to-noise ratio thresholds, network traffic or overload, detected failure(s) at network device(s) and so forth. The fault or undesired condition can be detected by the media device receiving the media content, by the video server 130 and/or by another network element, such as a network element being used for the transmission of the media content or a network element being used to monitor network conditions. As described above, the fault or undesired condition can be based on conditions in the network that impede or otherwise prevent a desired quality of service in the transmission of the media content and/or in the presentation of the media content.

The media processors 106 and wireless communication devices 116 can be adapted with software function 165 to utilize the services of video server 130. Software function 165 can enable the devices 106 and 116 to process the video content in order to improve the viewing experience of the user of the device. As an example, the video content can be received and parsed. One or more areas of attention or interest for one or more images or groups of images can be identified for the video content. The areas of attention can be based on a number of factors, such as one or more of a subject matter of the video content, pattern recognition applied to the video content, user preferences, metadata and so forth. As an example, a concert can have an area of attention that surrounds the singer while a movie can have an area of attention that surrounds the main actor(s). A geometric shape forming the area of attention(s) can be determined by the devices 106 and 116 and the dimensions of the shape can be adjusted (e.g., proportionally enlarging of reducing) based on a number of factors including a desired display resolution. Areas of the images outside of the area(s) of attention can be modified (e.g., horizontal and/or vertical stretching) to satisfy the final aspect ratio and/or display resolution. The modified images can be presented in place of unmodified images by the devices 106 and 116 during presentation of the media content. The above described process can be applied to any number of the images of the video content, including all of the images or only some of the images. The area of attention can be multiple areas of attention in a single image(s) and/or can be different areas of attention for different groups of images, such as for scene changes in a movie.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

In one or more embodiments, FIG. 1 can employ an IP Multimedia Subsystem (IMS) network architecture to facilitate the combined services of circuit-switched and packet-switched systems. For example, a Home Subscriber Server, a tElephone NUmber Mapping (ENUM) server, and other common network elements of an IMS network can establish communications between IMS-compliant communication devices (CDs), Public Switched Telephone Network (PSTN) CDs, and combinations thereof by way of a Media Gateway Control Function (MGCF) coupled to a PSTN network. The MGCF need not be used when a communication session involves IMS CD to IMS CD communications, where as a communication session involving at least one PSTN CD may utilize the MGCF. Various network elements such as a Proxy Call Session Control Function (P-CSCF), an interrogating CSCF (I-CSCF), and a Serving CSCF (S-CSCF) can be utilized for various functions, including registration via a Session Initiation Protocol (SIP INVITE) message while one or more application servers (ASs) can provide a variety of services to IMS subscribers. In this example, the network can support video conferencing. It is further appreciated that the CDs in this example can operate as wireline or wireless devices and/or can be communicatively coupled to a cellular base station, a femtocell, a WiFi router, a DECT base unit, and/or another suitable wireless access unit to establish communications with the IMS network. The cellular access base station in this example can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of this example. It is further contemplated that cellular phones supporting LTE can support packet-switched voice and packet-switched data communications and thus may operate as IMS-compliant mobile devices. In this embodiment, the cellular base station may communicate directly with the IMS network.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Figure 2:
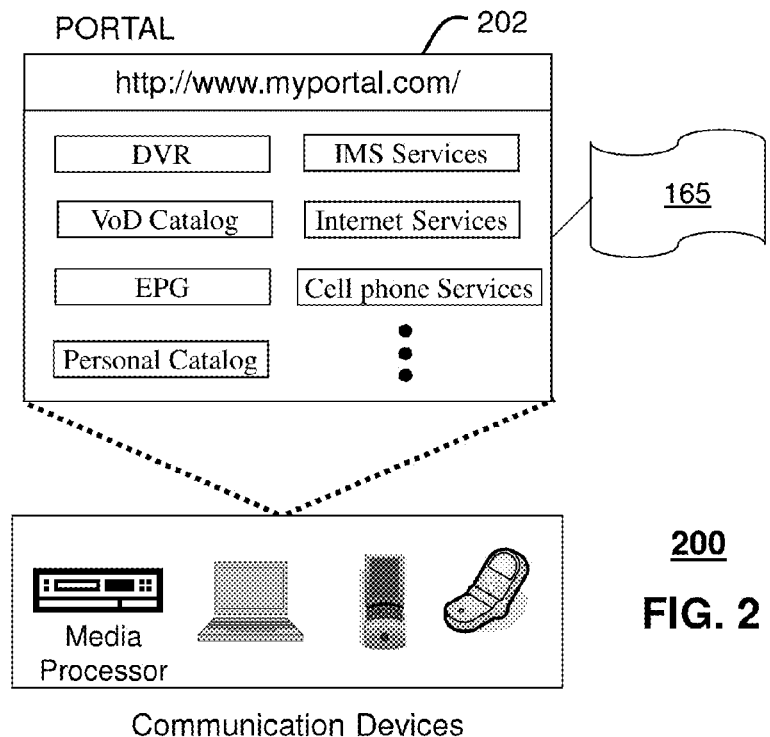
FIG. 2 depicts an illustrative embodiment of a web portal for interacting with the communication system of FIG. 1.

FIG. 2 depicts an illustrative embodiment of a web portal 202 which can be hosted by server applications operating from the computing devices 130 of the communication system 100 illustrated in FIG. 1. The web portal 202 can be used for managing services of communication system 100. A web page of the web portal 202 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIG. 1. The web portal 202 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 202 can also be used for provisioning IMS services described earlier, provisioning Internet services, provisioning cellular phone services, and so on.

Figure 3:
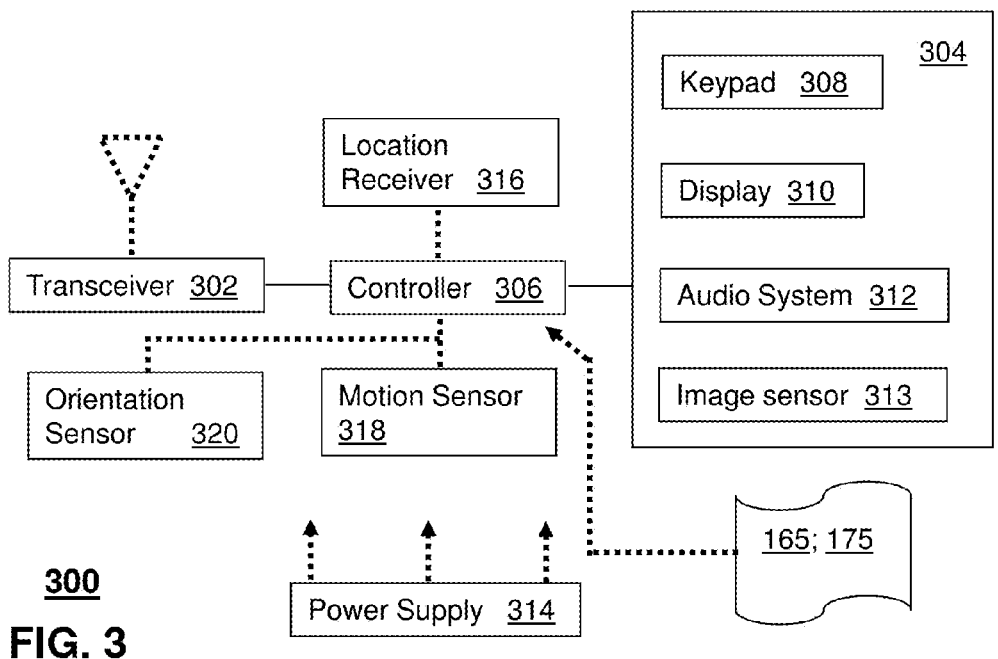
FIG. 3 depicts an illustrative embodiment of a communication device utilized in the communication system of FIG. 1.

FIG. 3 depicts an illustrative embodiment of a communication device 300. Communication device 300 can serve in whole or in part as an illustrative embodiment of the devices depicted in FIG. 1. The communication device 300 can comprise a wireline and/or wireless transceiver 302 (herein transceiver 302), a user interface (UI) 304, a power supply 314, a location receiver 316, a motion sensor 318, an orientation sensor 320, and a controller 306 for managing operations thereof. The transceiver 302 can support short-range or long-range wireless access technologies such as Bluetooth, Zig-Bee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 302 can also be adapted to support circuit-switched wireline access technologies (such as PSTN), packet-switched wireline access technologies (such as TCP/IP, VoIP, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric keypad commonly used by phones, and/or a QWERTY keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with navigation features.

The display 310 can use touch screen technology to also serve as a user interface for detecting user input (e.g., touch of a user's finger). As a touch screen display, the communication device 300 can be adapted to present a user interface with graphical user interface (GUI) elements that can be selected by a user with a touch of a finger. The touch screen display 310 can be equipped with capacitive, resistive or other forms of sensing technology to detect much surface area of a user's finger has been placed on a portion of the touch screen display. This sensing information can be used control the manipulation of the GUI elements.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. Alternatively, the charging system can utilize external power sources such as DC power supplied over a physical interface such as a USB port. The location receiver 316 can utilize common location technology such as a global positioning system (GPS) receiver capable of assisted GPS for identifying a location of the communication device 300 based on signals generated by a constellation of GPS satellites, thereby facilitating common location services such as navigation. The motion sensor 318 can utilize motion sensing technology such as an accelerometer, a gyroscope, or other suitable motion sensing to detect motion of the communication device 300 in three-dimensional space. The orientation sensor 320 can utilize orientation sensing technology such as a magnetometer to detect the orientation of the communication device 300 (North, South, West, East, combined orientations thereof in degrees, minutes, or other suitable orientation metrics).

The communication device 300 can use the transceiver 302 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such as Flash, ROM, RAM, SRAM, DRAM or other storage technologies.

Other components not shown in FIG. 3 are contemplated by the subject disclosure. For instance, the communication device 300 can include a reset button (not shown). The reset button can be used to reset the controller 306 of the communication device 300. In yet another embodiment, the communication device 300 can also include a factory default setting button positioned below a small hole in a housing assembly of the communication device 300 to force the communication device 300 to re-establish factory settings. In this embodiment, a user can use a protruding object such as a pen or paper clip tip to reach into the hole and depress the default setting button.

The communication device 300 as described herein can operate with more or less components described in FIG. 3. These variant embodiments are contemplated by the subject disclosure.

The communication device 300 can be adapted to perform the functions of the media processor 106, the media devices 108, or the portable communication devices 116 of FIG. 1, as well as the IMS CDs and PSTN CDs. It will be appreciated that the communication device 300 can also represent other common devices that can operate in communication system 100 of FIG. 1 such as a gaming console and a media player.

It is contemplated by the subject disclosure that the communication device 300 shown in FIG. 3 or portions thereof can serve as a representation of one or more of the devices of communication system 100. It is further contemplated that the controller 306 can be adapted in various embodiments to perform the functions of adjusting images of video content according to area(s) of attention, display resolution and/or aspect ratios.

Figure 4:
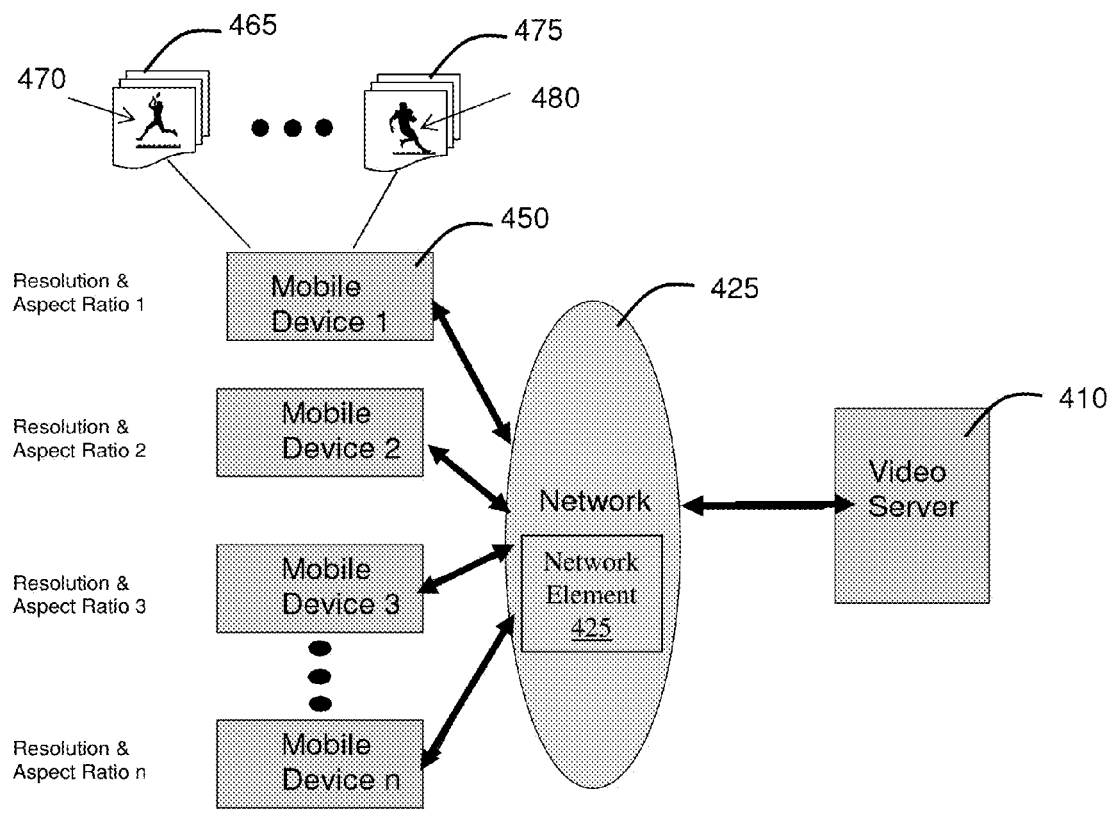
FIG. 4 depicts an illustrative embodiment of another communication system that provides media services.

FIG. 4 depicts an exemplary embodiment of a communication system 400 for delivering media content. Communication system 400 can be overlaid or operably coupled with communication system 100 as another representative embodiment of said communication system. System 400 can include a video server 410 that provides media content including video content to a group of communication devices including mobile devices 450 via network 425 which can be a wireline and/or wireless network. The media content can be provided using a number of different delivery techniques, including broadcast, multicast and/or unicast. Other communication devices can also receive the media content, including set top boxes and/or personal computers.

In one embodiment, the group of mobile devices 450 can receive media content in a single format (e.g., default display resolution, default aspect ratio, and other default characteristics) which reduces the use of processing resources of the service provider as compared to a system that is unicasting different formats of the media content to each of the different devices based on the display characteristics of the devices. Each of the mobile devices can then analyze and adjust the video content based on device characteristics, user preferences, and so forth.

In one embodiment, one of the mobile devices (which will be referred to as mobile device 450) can receive the media content and then parse the media content, which can include parsing video content including images. The mobile device 450 can identify an area of attention in one or more images or one or more groups of images. The area of attention can be the area of the image(s) that a viewer is most interested in viewing. Sometimes the area of attention is a center region of the image(s). This occurs because cameras capturing the content are often aimed so that the objects are centered in the images. However, the area of attention depends on the images and in particular the objects in the images being shown. For example, a movie may have a scene in which there are several persons present in opposite ends of a room. If the camera captures the entire room but only the persons on one side of the room are speaking then the area of attention may by the one side of the room although those persons are not in the center of the image. As another example, in a sporting event, the camera may capture all members of the team so the members are spread out over the entire image(s), but the area of attention may only be a few of those members that are interacting with the ball. The area of attention can also be multiple areas in an image. Returning to the example of the sporting event, a first area of attention in the image(s) may be those members of the team that are directly in proximity to the ball and a second area of attention may be those members of the team that are intended to receive the ball. In this example, the first and second areas of attention may be on opposite sides of the image and the middle or center portion of the image(s) may be outside of the two areas of attention. While this example describes two areas of attention, the exemplary embodiments can include any number of areas of attention in an image(s) including a single area of attention or more than two areas of attention.

The area(s) of attention can be utilized for multiple images such as in a movie where the scene and its background remains relatively static or in a sporting event where a play involves limited movement. The area(s) of attention can also be associated with or otherwise follow a particular object(s) even though there is a scene change or movement of the members of the team in the above-described example. As an example, a movie may depict two actors who are talking to each other as they walk through a store. The area of attention can surround the two actors regardless of the changes to the background scenes. In another example, the area of attention can surround a member of the sports team that is carrying the ball and can continue to surround the ball carrier even though the ball carrier is running up the field and other members of the team appear and disappear in the images.

The areas of attention can also change based on changes to the images. As an example, in a sporting event, a first group of images 465 can include a first area of attention 470 that surrounds a player that is catching a football. The area of attention can continue to surround the player for the entire play. In a subsequent play captured in a second group of images, a second area of attention 480 can surround a different player that has been handed the football and is running up the field. In this example, the first and second groups of images 465, 475 each include single areas of attention, although in one or more embodiments multiple areas of attention can be utilized for one or more images or groups of images. The exemplary embodiments can also include any number of groups of images that include one or more areas of attention, as well as images that do not have any area of attention.

Once the area(s) of attention is identified, the mobile device 450 can modify the image(s). For example, a geometric shape can be determined for the area of attention. As an example, if the area of attention surrounds a football player, then the shape for the area of attention can be a rectangle. The determination or otherwise defining of the shape of the area of attention can be based on a number of factors, including a shape and/or dimensions of the display device and/or the images, user preferences, device display characteristics, subject matter of the video content, a shape and/or dimensions of object(s) in the image and so forth.

The mobile device 450 can then adjust the area of attention based on a desired or final display resolution. In one embodiment, the mobile device 450 can proportionally enlarge or reduce the geometric shape of the area of attention. In another embodiment, the mobile device 450 can move the area of attention to a different region in the display, such as centering the area of attention.

Once the area of attention has been adjusted, the mobile device 450 can identify and adjust a peripheral portion of the image that surrounds or is otherwise outside of the area of attention defined by the geometric shape. For example, the mobile device 450 can apply a horizontal and/or a vertical stretching of the peripheral portion to meet a desired or final aspect ratio and/or the desired or final display resolution. The adjustments to the area of attention and the peripheral portion results in an adjusted image which can be presented by the mobile device 450 in place of the original image that was received from the video server. As described above, any number of images of the video content can be replaced by adjusted images that can be based on any number of areas of attention.

In one embodiment, the video server 410 can generate or access multiple versions of the media content that include different amounts of error correction and a corresponding different level of resolution. The video server 410 can switch between the versions of content being transmitted based on a fault or undesired condition that is detected with respect to the transmission or presentation of the content at one or more of the mobile devices 450. The detection can be performed by various devices including mobile device(s) 450, video server 420 and/or network element 425. In one embodiment, network element 425 can be a device that performs network monitoring for the fault or undesired condition. In another embodiment, the network element 425 can be an intermediary device that is utilized in the transmission of the media content from video server 410. In one embodiment, a mobile device 450 experiencing a fault or undesired condition can receive a different version of the content (e.g., having lower resolution with more error correction data) via a different delivery source or channel. As an example, a mobile device 450 can begin receiving the video content by way of a first multicast and then be switched to a second multicast that includes the different version of the content. In another example, the mobile device 450 can receive the different version of the content via a unicast.

Figure 5:
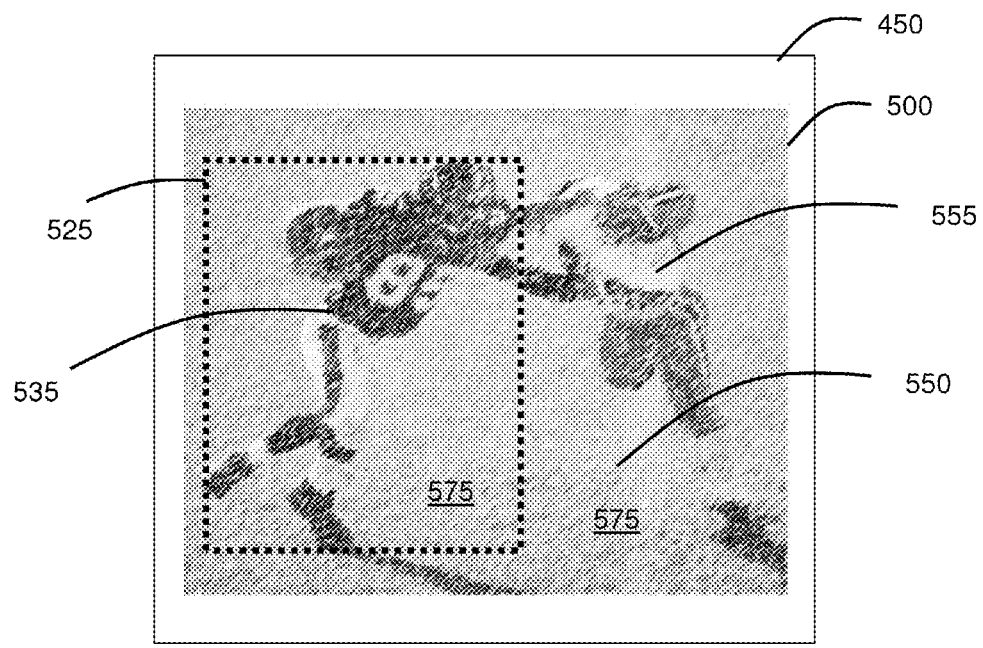
FIGS. 5 and 6 depict media content that is received and adjusted by the illustrative embodiment of FIG. 1.
Figure 6:
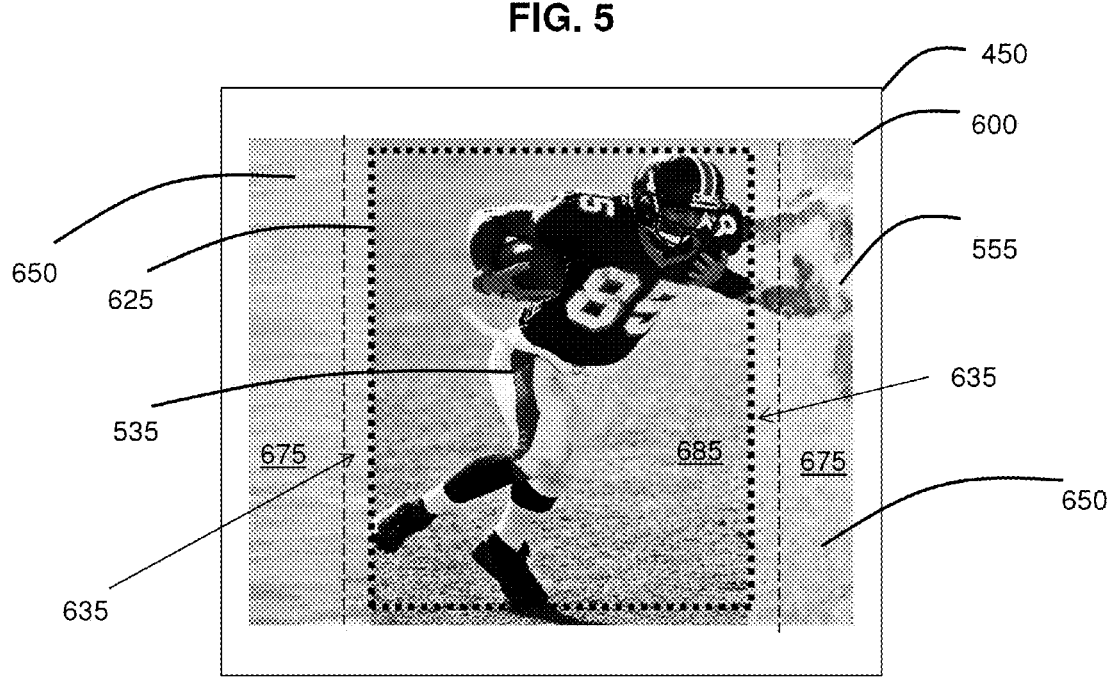

Referring to FIGS. 5 and 6, an example of the image processing is illustrated. An image 500 can be received by the mobile device 450. In one embodiment, if the image 500 were to be presented at mobile device 450 it would appear as shown in FIG. 5 having the display resolution 575 which can be based on a number of factors including the display characteristics of the mobile device 450.

An area of attention 525 can be identified by the mobile device 450 for the image 500. In this example, the area of attention 525 is defined by a rectangle and is based on the object 535 (e.g., a football player carrying the ball). The mobile device can identify a peripheral portion 550 of the image, which is the area of the image 500 that is outside of the area of attention 525. In this example, object 555 (e.g., a football player not carrying the ball) is in the peripheral portion 555.

The mobile device 450 can adjust image 500 resulting in adjusted image 600. Image 600 can include an adjusted area of attention 625 which was generated by the mobile device 450 in this example by enlarging the area of attention 525 and by centering the area of attention. An adjusted peripheral portion 650 can be generated by the mobile device 450 in this example by stretching the peripheral portion 550 in a vertical and horizontal direction. As seen in adjusted image 600, some of the peripheral portion 550 is no longer displayed by the mobile device 450.

In one embodiment, the adjusted image 600 can include more than one display resolution. For example, the adjusted area of attention 625 can include a first display resolution 685 while the adjusted peripheral portion 650 can include a second display resolution 675. In one embodiment, the first display resolution 685 can be higher than the second display resolution 675. One or both of the first and second display resolutions 685, 675 can be the same or different from display resolution 575 of the original image 500. As an example for the adjusted image 600, the first display resolution 685 in the adjusted area of attention 625 can have the same value as the display resolution 575 in the original image 575 while the second display resolution 675 in the adjusted peripheral portion 650 can have a lower value. In another example for the adjusted image 600, the first display resolution 685 in the adjusted area of attention 625 can have a higher value than the display resolution 575 in the original image 575 while the second display resolution 675 in the adjusted peripheral portion 650 can have a lower value than the display resolution 575 in the original image 575.

In one embodiment, a boundary zone 635 can be established between the adjusted area of attention 625 and the adjusted peripheral portion 650. The boundary zone can be an area of transition with characteristics that are smoothed or otherwise modified to improve the transition between the adjusted area 635 and portion 650. For example, where different first and second display resolutions 685, 675 are being utilized in adjusted image 600 then boundary zone 635 can include an intermediate value for a display resolution to avoid an abrupt change in display resolution. In one embodiment, the mobile device 450 can apply a linear change to the display resolution over the boundary zone 635 such that the display resolution changes over the boundary zone from the first display resolution 685 to the second display resolution 675 in a linear, incremental fashion.

Figure 7:
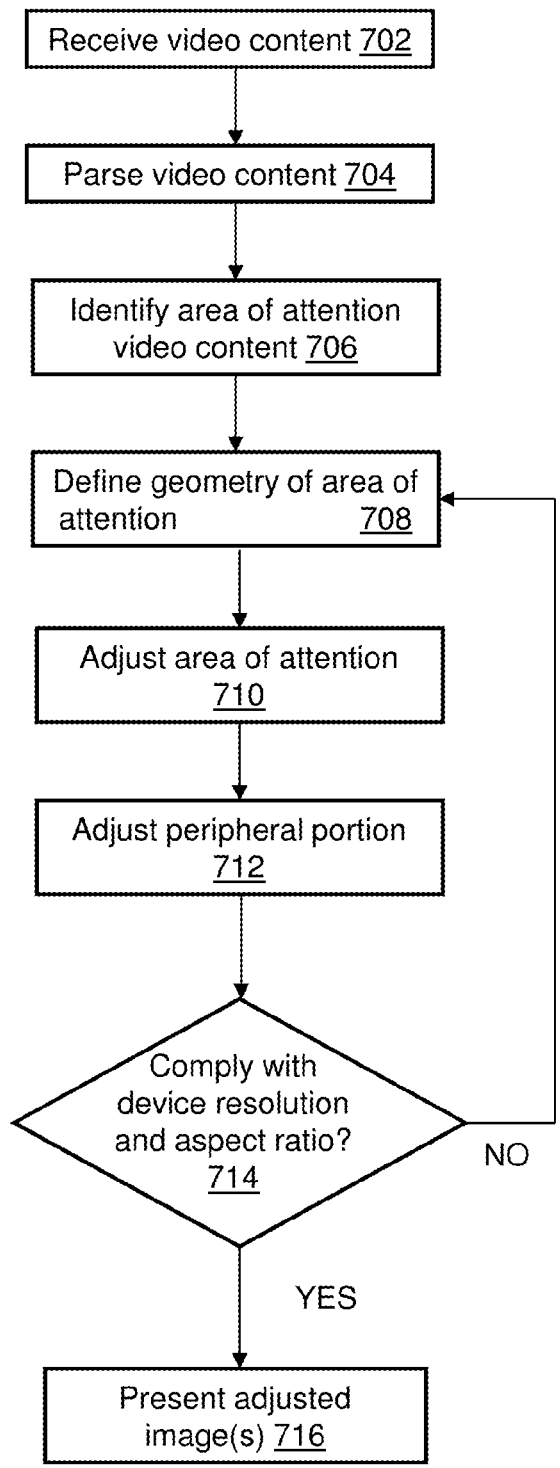
FIG. 7 depicts an illustrative embodiment of a method operating in portions of the system described in FIG. 1.

FIG. 7 depicts an illustrative method 700 that operates utilizing portions of the devices and/or images of FIGS. 1-6. Method 700 can begin with step 702 in which a media device, such as mobile device 450, receives media content including video content over a network from a source, such as video server 410. The source can provide the media content in a number of different ways, such as wirelessly via a broadcast or multicast, although other techniques and devices for delivery are also contemplated. In step 704, the media device can parse the video content to facilitate analysis and processing of one or more of the images or groups of images therein. In step 706, an area of attention in an image(s) of the video content can be identified or otherwise detected by the media device based on the parsing. The area of attention can be identified based on a number of different factors and techniques. For example, metadata associated with the content can be accessed that identifies the area(s) of attention and/or that identifies information from which the area(s) of attention can be determined, such as a subject matter of the content. In another example, image pattern recognition can be applied to the image(s) to identify object(s) therein. The recognized objects can be used to identify the area(s) of attention, such as recognizing a particular actor in a movie and utilizing the actor (i.e., the detected object) as the area of attention. In one embodiment, the detected objects via the image pattern recognition analysis can be utilized in conjunction with the known subject matter of the content (e.g., subject matter identified via metadata) to identify the area(s) of attention. Other factors for determining the area(s) of attention can include user preferences such as a viewer who likes to watch a ball carrier in a football game.

In step 708, the media device can determine a shape for the area of attention. The determination of the shape can be based on a number of factors, including one or more of a shape of the display device, a shape of the object(s) in the area of attention, a desired aspect ratio for the content, display characteristics of the media device, user preferences, metadata that indicates preferred shapes such as based on the type of content, and so forth In step 710, the media device can adjust the area of attention. The adjustment to the area of attention can be based on a number of factors, including based on a desired display resolution for the video content or approximating a final display resolution for the content. Other factors for the adjustment of the area of attention can include one or more of user preferences, desired aspect ratio, type of content, and so forth. The adjustment of the area of attention can include enlarging or reducing the area of attention, including proportionally enlarging or reducing the defined shape, although non-proportional enlargement or reduction can also be utilized. Another adjustment can include adjusting the display resolution within the area of attention. For example, the area of attention can include the highest allowable or enabled display resolution for the media device. Yet another adjustment can include moving the position of the area of attention, such as centering the area of attention in the display.

In step 712, the media device can identify and adjust a peripheral portion of the image that surrounds the adjusted area of attention. For example, the media device can stretch the peripheral portion in a horizontal and/or vertical direction based on the adjusting of the area of attention, a desired display resolution and/or a desired aspect ratio for the video content. In one embodiment, the desired display resolution and/or desired aspect ratio can be determined based on user preferences, device display characteristics, and/or media content characteristics.

In step 714, the media device can confirm that the adjusted image, including any adjustments to the area of attention and the peripheral portion comply with device characteristics including device resolution as well as aspect ratio limitations and/or recommendations.

In step 716, the adjusted image can replace the original image during presentation of the content at the media device. The process of identifying areas of attention and adjusting the images based on the areas of attention as described in steps 702-714 can be repeated for one or more other images or groups of images.

Upon reviewing the aforementioned embodiments, it would be evident to an artisan with ordinary skill in the art that said embodiments can be modified, reduced, or enhanced without departing from the scope and spirit of the claims described below. For example, in one embodiment, the adjusted image(s) can maintain the same display resolution throughout but can be modified based on adjusting the dimensions of the area of attention, adjusting the position of the area attention (e.g., centering), stretching in a horizontal and/or vertical direction the peripheral portion, and/or cropping or otherwise not showing outer portions of the peripheral portion. In another embodiment different images can utilize different display resolution.

In one embodiment, the mobile device 450 can increase display resolution for portions of images received from the video server 410 utilizing a number of different techniques including pixel interpolation and/or accessing data associated with higher display resolutions for the media content.

In one embodiment, the mobile device 450 can provide the adjusted video content to one or more other communication devices for presentation. The other communication device can present that content in its currently adjusted format that is based on the area(s) of attention and/or can further modify the content, such as modifying based on display characteristics of the other communication device or modifying based on area(s) of attention and image adjustment performed by the other communication device.

In one embodiment, the area of attention can be based on an analysis of viewers of the video content and/or of similar video content. For instance, viewer facial imaging during presentation of content in conjunction with tracking software can be utilized to determine if viewers typically focus on a first region of the image as opposed to focusing on a second region of the image. In one embodiment, the analysis can be performed prior to transmission of the media content to mobile device 450 (e.g., by an analysis server in communication with video server 410) and the results of the analysis can be provided to the mobile device, such as via metadata accompanying the video content that identifies areas of attention in one or more of the images. In another embodiment, the analysis can be performed by the mobile device 450 or another communication device of the viewer. For instance, the mobile device 450 can perform the analysis on a football game to determine that the particular viewer typically focuses on the quarterback. This information can be stored and utilized during subsequent presentations of football games for identifying the area of attention to include the quarterback. In one embodiment, the analysis can be performed by the mobile device 450 during the presentation of a first portion of the video content and utilized by the mobile device 450 for image adjustment in a second portion of the video content. It should be understood that the analysis and/or image adjustment can be performed by any number of devices, including the mobile device 116, 450, set top box 106, personal computer 108, server 130 and so forth. It should be further understood that the analysis and/or image adjustment can be performed based on various types of media content, including still images and video, and can also be movies, sports events, television shows, video games, and so forth.

In one embodiment, the media device can present the adjusted image(s) on a separate device, such as a set top box that analyzes and adjusts the image(s) and then provides the adjusted image(s) for presentation on a television. In this example, the set top box can obtain display device information (e.g., identification information) or characteristics (e.g., parameters) associated with the display device, such as the screen size, aspect ratio capability, video filtering, contrast ratio capability, high-definition compatibility and so forth. In one embodiment, the media device can be a multi-mode mobile device that presents the adjusted images on a separate display device, such as through short-range wireless communication (e.g., WiFi) between the mobile device and a set top box or television.

In one embodiment, the adjusting of the image(s) can be based on one or more of color depth, frame rate, and/or compression techniques associated with the content and/or the media device displaying the content.

In another embodiment, the image(s) can be altered by adjusting the color depth in proximity to the actors being shown in a movie but maintaining the color depth for portions of the display that are remote from the actors, where the actors are determined to be included in the area of attention.

In one embodiment, the media device can adjust the format of the media content to a targeted format using techniques including transcoding (e.g., decoding and decompressing the original data to a raw intermediate format and then re-encoding into a target format), transrating the format and/or transsizing the format (e.g., changing the picture size of video). Other embodiments are contemplated by the subject disclosure.

Other suitable modifications that can be applied to the present disclosure without departing from the scope of the claims below. Accordingly, the reader is directed to the claims section for a fuller understanding of the breadth and scope of the present disclosure.

Figure 8:
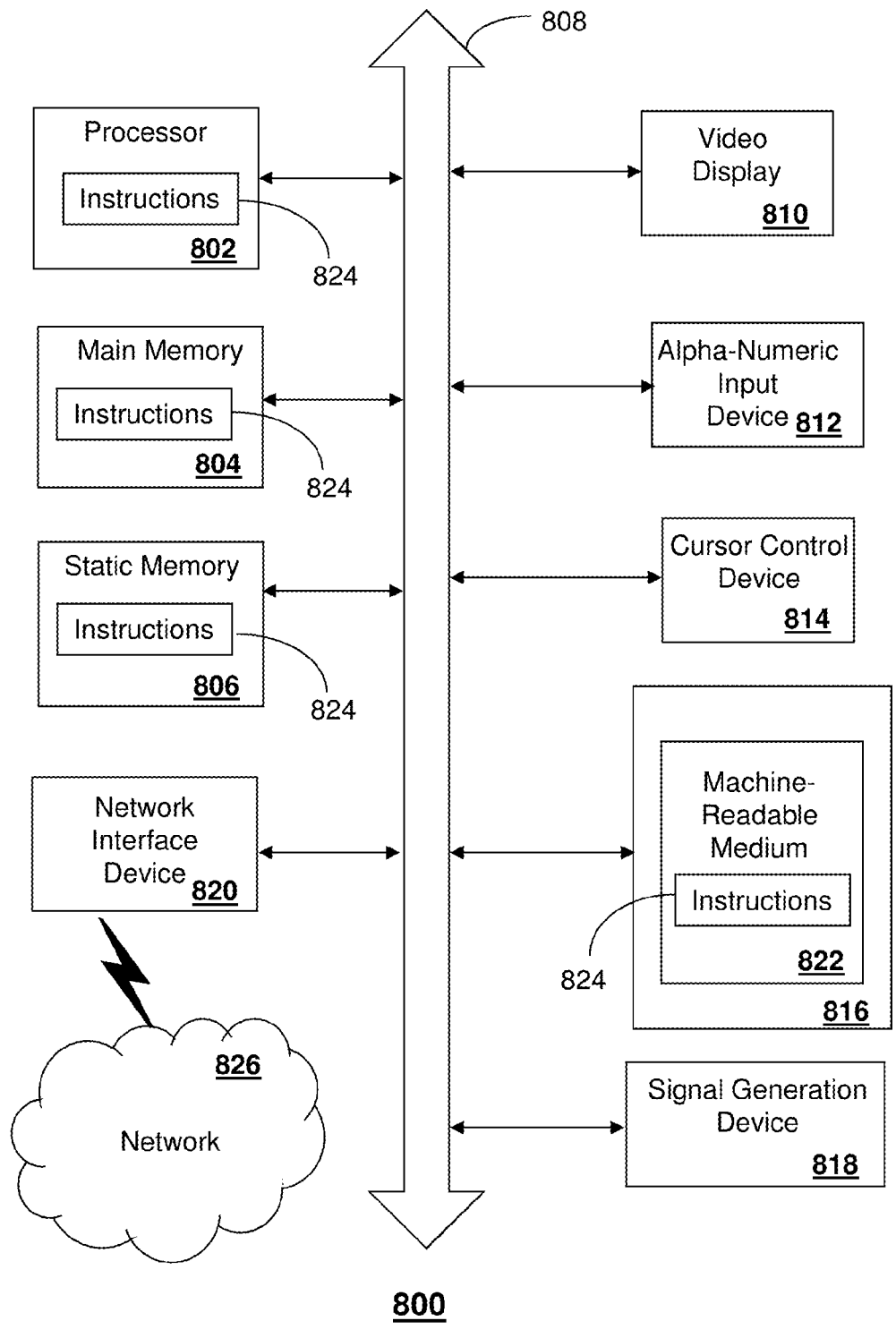
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the server 130 and/or 410, media processor 106, mobile device 116 and/or 450 and other devices of FIGS. 1-7. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure. One or more of the exemplary embodiments can be operated according to the features (e.g., devices and/or method steps) described herein or can be operated without utilizing the recited feature.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device comprising:
    a display;
    a memory to store instructions; and
    a processor coupled with the memory and the display, wherein responsive to executing the instructions, the processor performs operations comprising:
        parsing video content;
        accessing user preferences for identifying first and second areas of attention in the video content based on the user preferences;
        identifying the first area of attention in an image of the video content based on the parsing and the user preferences;
        determining a first shape for the first area of attention;
        identifying the second area of attention in the image based on the parsing and the user preferences;
        determining a second shape for the second area of attention;
        adjusting the first shape to a first resolution based on a desired display resolution for the video content to generate an adjusted first shape for the first area of attention;
        adjusting the second shape to a second resolution based on the desired display resolution to generate an adjusted second shape for the second area of attention;
        identifying a first peripheral portion that surrounds the first shape;
        identifying a second peripheral portion that surrounds the second shape;
        identifying a boundary zone between the first shape and the second shape, wherein the boundary zone utilizes a third display resolution having a value between the first and second resolutions; and
        presenting the adjusted first shape, the boundary zone, and the adjusted second shape in place of the first and second areas during presentation of the video content at the display.

2. The mobile device of claim 1, wherein the operations further comprise receiving the video content over a network from a video server, wherein the adjusted first shape has at least two different display resolutions, wherein a first display resolution is utilized within the adjusted first shape of the first area of attention and wherein a second display resolution is utilized within the first peripheral portion of the adjusted first shape.

3. The mobile device of claim 2, wherein the first display resolution is a highest display resolution enabled by the display.

4. The mobile device of claim 1, wherein the operations further comprise accessing metadata associated with the video content.

5. The mobile device of claim 4, wherein the operations further comprise determining a subject matter of the video content based on the parsing and the metadata, wherein the first and second areas of attention are identified based on the subject matter.

6. The mobile device of claim 1, wherein the adjusted second shape has at least two different display resolutions, wherein a first display resolution is utilized within the adjusted second shape and wherein a second display resolution is utilized within the second peripheral portion.

7. The mobile device of claim 1, wherein the operations further comprise performing image recognition analysis to identify objects in the first and second shapes, wherein the first and second areas of attention are identified based on the objects.

8. The mobile device of claim 1, wherein the operations further comprise providing a linear change of a display resolution along a transition area between the adjusted first shape and the first peripheral portion.

9. The mobile device of claim 1, wherein the operations further comprise accessing user preferences, wherein one of a desired display resolution or a desired aspect ratio is determined based on the user preferences.

10. The mobile device of claim 1, wherein the adjusting of the first shape proportionally enlarges the first area of attention.

11. The mobile device of claim 1, wherein the operations further comprise stretching the first peripheral portion in one of a horizontal or vertical direction based on the adjusting of the first shape, a desired display resolution, and a desired aspect ratio for the video content to generate an adjusted first peripheral portion for the first shape.

12. The mobile device of claim 11, wherein the adjusted first peripheral portion removes a portion of the first peripheral portion.

13. A non-transitory machine-readable storage medium, comprising instructions, wherein responsive to executing the instructions, a processor performs operations comprising:
identifying first and second areas of attention in an image of video content based on user preferences;
adjusting a resolution of the first area to generate an adjusted area of attention having a first resolution as a first adjusted area;
adjusting a resolution of the second area to generate an adjusted area of attention having a second resolution as a second adjusted area;
adjusting a size of a peripheral portion that surrounds the first adjusted area in one of a horizontal or vertical direction based on the first adjusted area as an adjusted peripheral portion, a desired display resolution, and a desired aspect ratio to generate an adjusted peripheral portion that utilizes a first display resolution within the first adjusted area and a second display resolution in the adjusted peripheral portion;
identifying a boundary zone between the first adjusted area and the second adjusted area, wherein the boundary zone utilizes a third display resolution having a value between the first and second resolutions; and
replacing the image with the first adjusted area, the second adjusted area, and the boundary zone during presentation of the video content at a display device.

14. The non-transitory machine-readable storage medium of claim 13, wherein the operations further comprise:
receiving of the video content via one of a broadcast or a multicast;
parsing the video content; and
applying image pattern recognition to the image to identify objects in the image, wherein the identifying of the first and second areas of attention are based on the parsing and the objects.

15. The non-transitory machine-readable storage medium of claim 13, wherein the operations further comprise receiving the video content over a network from a video server, wherein the adjusting of the size of the first area of attention comprises adjusting an aspect ratio for the first area of attention based on the user preferences or dimensions of the display device.

16. The non-transitory machine-readable storage medium of claim 13, wherein the operations further comprise:
parsing the video content; and
accessing metadata associated with the video content, wherein the identifying of the area of attention is based on the parsing and the metadata.

17. The non-transitory machine-readable storage medium of claim 13, wherein the operations further comprise:
detecting a fault associated with the video content;
transmitting a request to a video server for another version of the video content that is different from a first version of the video content received by the display device;
responsive to the request, receiving the other version of the video content, wherein the other version of the video content includes more error correction data than is included with the first version of the video content;
identifying another area of attention in another image of the other version of the video content;
adjusting a size of the other area of attention based on the desired display resolution to generate another adjusted area of attention;
adjusting a size of another peripheral portion that surrounds the other area of attention in one of the horizontal or vertical direction based on the other adjusted area of attention, the desired display resolution and the desired aspect ratio to generate another adjusted peripheral portion of another adjusted image that utilizes the first display resolution within the adjusted area of attention and a third display resolution in the adjusted peripheral portion; and
replacing the other image with the other adjusted image during presentation of the other version of the video content at the display device.

18. A method, comprising:
receiving, by a device including a processor, video content via a network from a server;
receiving, by the device, user preferences for identifying first and second areas of attention in the video content based on the user preferences;
determining, by the device, the first and second areas of attention in an image of the video content, wherein the determining comprises determining first and second desired display resolutions for the first and second areas of attention;
adjusting, by the device, dimensions of the first and second areas of attention based on the first and second desired display resolutions to generate an adjusted area of attention of an adjusted image, wherein the adjusted area of attention of the adjusted image is based on the first area of attention;
adjusting, by the device, dimensions of a peripheral portion that surrounds the area of attention based on the adjusted area of attention to generate an adjusted peripheral portion in the adjusted image, wherein a linear change of a display resolution is provided along a transition area between the adjusted area of attention and the adjusted peripheral portion, and wherein the adjusted peripheral portion in the adjusted image is based on the second area of attention; and replacing the image with the adjusted image during presentation of the video content at a display of the device.

19. The method of claim 18, wherein a single version of the video content is provided by the server to a group of devices that includes the device, wherein the adjusted image utilizes the first display resolution within the adjusted area of attention and the second display resolution in the adjusted peripheral portion, and wherein the dimensions of the peripheral portion are adjusted based on a desired aspect ratio.

20. The method of claim 18, wherein the device is a mobile device, and further comprising:

parsing the video content; and applying image pattern recognition to the image to identify objects in the image, wherein the first and second areas of attention of attention are selected based on the parsing and the objects.

\* \* \* \* \*